United States Patent
Robley, Jr.

(10) Patent No.: US 6,550,446 B1
(45) Date of Patent: Apr. 22, 2003

(54) AIR INTAKE FLOW DEVICE FOR INTERNAL COMBUSTION ENGINE

(76) Inventor: Spencer H Robley, Jr., 13603 Marina Pointe Dr., No. B-422, Marina del Rey, CA (US) 90292

(*) Notice: Subject to any disclaimer, the term of this patent is extended or adjusted under 35 U.S.C. 154(b) by 0 days.

(21) Appl. No.: 09/570,273

(22) Filed: May 12, 2000

(51) Int. Cl.⁷ .............................. F02B 31/04; F15D 1/02
(52) U.S. Cl. ..................... 123/306; 123/590; 138/37
(58) Field of Search .................... 123/306, 590; 138/37, 39; 48/189.4

(56) References Cited

U.S. PATENT DOCUMENTS

| | | | | |
|---|---|---|---|---|
| 1,115,699 A | * | 11/1914 | Loose ..................... | 138/37 |
| 1,182,954 A | * | 5/1916 | Wolf ....................... | 138/37 |
| 1,514,132 A | * | 11/1924 | Cortelyou ............... | 138/37 |
| 4,962,642 A | * | 10/1990 | Kim ........................ | 123/590 |
| 5,704,326 A | | 1/1998 | Minegishi et al. ....... | 123/184.53 |
| 5,775,283 A | | 7/1998 | Sawai et al. ............ | 123/184.53 |
| 5,803,029 A | | 9/1998 | Yoshihara et al. ...... | 123/90.16 |
| 5,894,827 A | | 4/1999 | Kamura et al. ......... | 123/305 |
| 5,896,839 A | | 4/1999 | Togai ...................... | 123/295 |
| 5,924,398 A | | 7/1999 | Choi ........................ | 123/184.21 |
| 5,947,081 A | | 9/1999 | Kim ........................ | 123/306 |
| 5,979,395 A | | 11/1999 | Mallen et al. ........... | 123/243 |
| 6,032,634 A | | 3/2000 | Minegishi et al. ...... | 123/184.55 |
| 6,036,434 A | | 3/2000 | Ray et al. ............... | 415/111 |

OTHER PUBLICATIONS

The Tornado® air intake flow unit; Tornado Air Management http://www.tornadoair.com pages. printed from internet on May 2, 2000.

* cited by examiner

*Primary Examiner*—Andrew M. Dolinar
(74) *Attorney, Agent, or Firm*—Holland & Knight LLP

(57) ABSTRACT

An air intake flow device to manipulate the airflow in an air entry chamber of a positive displacement internal combustion engine. The air intake flow device is comprised of a skirt defining an air flow passageway, multiple vanes extending into the airflow passageway from a first leading edge at the surface of the skirt. The configuration of the vanes direct the airflow into a vortex like configuration which is understood to improve air intake across the intake valve into the combustion chamber and thereby improve oxidation of the fuel. The airflow device is preferably constructed in a fashion so that the installer of the device can readily adapt its configuration by applying hand pressure from a first manufactured configuration to second installation configuration. Thus, the device is suitable for adaptation to various air entry chamber shapes.

29 Claims, 6 Drawing Sheets

AIR INTAKE FLOW DEVICE FOR INTERNAL COMBUSTION ENGINE

The field of the present invention relates generally to air intake systems for an internal combustion engine.

BACKGROUND OF THE INVENTION

Internal combustion engines produce mechanical power from the chemical energy contained in hydrocarbon fuel. The energy is released by burning or oxidizing the fuel internally within the engine's structure (e.g., the cylinders of the engine). As such, the amount of energy or power released from the fuel is a function of the degree of oxidation and, therefore, is consequently dependent on the amount of oxygen available during combustion. It is presently understood that as a general principle the greater the degree of oxidation of the fuel the higher the efficiency (reflected for example in the gas mileage of an automobile) and the greater the power output (reflected for example in horsepower).

Combustion of hydrocarbon fuels in internal combustion engines has been found to produce generally three major pollutants: (1) oxides of nitrogen ($NO_x$), (2) oxides of carbon ($CO$, $CO_2$), and (3) hydrocarbons (HC). Carbon dioxide ($CO_2$) is a generally considered a non-toxic necessary by-product of the hydrocarbon oxidation process. With respect to carbon monoxide (CO) and hydrocarbon emissions it is understood that increased oxidation during combustion tends to reduce the formation of these compounds by way of oxidation. With respect to $NO_x$ emissions, their formation is understood to be largely a function of combustion temperatures. However, it is also presently understood that leaner fuel-air mixtures and improved mixing of the fuel and air may tend to reduce $NO_x$ formation. In order to reduce the emissions from internal combustion engines directly to the environment, catalytic converters have been employed. Catalytic converters are costly and their effectiveness over time weakens requiring inspection and replacement to maintain performance. The life span of these devices, however, is understood to be a function of the amount of pollutants (primarily unburned hydrocarbons) that the device has processed. Accordingly, in addition to increasing the efficiency and power output of combustion, increased oxidation during combustion is also likely to increase the life span of the catalytic converter.

Reciprocating and rotary engines, such as the Wankel engine, comprise the two categories of positive displacement engines that are traditionally employed to power motor vehicles. In general a positive displacement internal combustion engine is an engine in which the flow of the fuel-air mixture is segmented into distinct volumes that are completely isolated by solid sealing elements throughout the engine cycle, creating compression and expansion through the physical volume changes within the chamber. Of the two engines, the reciprocating engine is by far the more common.

Reciprocating engines incorporate a piston that moves back and forth in a cylinder and transmits power through a connecting rod and crank mechanism to the drive shaft. A majority of reciprocating engines work on what is called a four-stroke cycle. That is, each cylinder of the engine requires four-strokes of its piston or two revolutions of the crankshaft to complete the sequence of events which produces one power stroke. The first stroke is termed an intake stroke. It starts with the piston at top center crank position and ends with the piston at the bottom center crank position. As the piston moves from the top to the bottom center crank position, fresh intake mixture generally comprised of air or air and fuel is drawn into the cylinder through an inlet valve, which typically opens just before the stroke starts and closes shortly after it ends. Whether the intake mixture drawn into the cylinder is comprised of air or air and fuel is dependent on the engine. For example, in a typical spark ignition engine, air passes through an air filter and then is mixed with fuel in the intake system prior to entry to the engine using a carburetor or fuel injection system. The air-fuel mixture is then drawn into the cylinder via the intake valve during the intake stroke. In comparison, a compression ignition engine inducts air alone into the cylinder during the intake stroke and the fuel is directly injected into the engine cylinder just before combustion.

FIG. 6 is an illustration of a standard cylinder, piston and valve configuration for a reciprocating engine with the cylinder approaching bottom center crank position during an intake stroke. The inlet valve, through which the intake mixture is drawn, is generally comprised of an elongated rod called the valve stem and an integrally connected generally disc shaped surface called the valve head. The valve head is manufactured to have a seat that is adapted to mate with the internal edge surface of an orifice or port located usually in the top of the cylinder. The valve head and stem, even in the open position, constitute obstacles that may limit the flow of the intake mixture to the combustion chamber or cylinder. Furthermore, over time the surfaces of the head, stem and port are prone to accumulate particulate matter, which further tends to obstruct the flow of intake mixture into the cylinder.

In order to increase the volume of intake mixture into the combustion chamber, devices such as superchargers (which admit pre-compressed fresh mixture) and turbochargers (which admit fresh mixture compressed in a compressor driven by an exhaust turbine) have been employed. Unlike naturally aspirated engines (engines that admit atmospheric air), engines that employ these devices admit compressed intake mixtures into the combustion chamber to increase the quantity of intake air admitted into the combustion chamber during an intake stroke. From a functional standpoint, it is noted that superchargers typically increase the pressure of the intake mixture by a much greater amount than a turbocharger, and as such limitations by the intake valve to the flow of the intake mixture are less of an issue when a supercharger is employed. Turbochargers and superchargers, however, draw useable power from the engine, add noticeable weight to the motor vehicle, require additional space within the engine compartment for mounting, are expensive to manufacture, and employ moving mechanical elements that are prone to wear and, thereby, over time necessitate repair. Furthermore, these devices are difficult and costly to retrofit onto existing engines.

In light of the foregoing, it is desirable to provide an air intake device and method suitable for naturally aspirated and turbo-charged positive displacement internal combustion engines.

SUMMARY OF THE INVENTION

The present invention relates in one aspect to an air intake flow device capable of manipulating the airflow in an air entry chamber of a positive displacement internal combustion engine.

According to one aspect as described herein, the air intake flow device comprises a configurable skirt and a plurality of vanes extending from the configurable skirt, wherein the skirt is adaptable to a plurality of air entry chamber shapes.

According to another aspect, the air intake flow device comprises a skirt and a plurality of adaptable vanes extending from the skirt, wherein the vanes are capable of being oriented to manipulate impinging airflow into a plurality of configurations.

According to yet another aspect as described herein, the air intake flow device comprises a skirt defining an airflow passageway and a plurality of vanes extending at a first angle and a second angle from the skirt into the airflow passageway, wherein the first angle is between 25 and 35 degrees relative to an axis perpendicular to the airflow passageway.

Additional implementations, features, variations and advantages of the invention will be set forth in the description that follows, and will be further evident from the illustrations set forth in the accompanying drawings.

BRIEF DESCRIPTION OF THE DRAWINGS

The accompanying drawings illustrate presently preferred implementations of the invention and, together with the description, serve to explain various principles of the invention.

DETAILED DESCRIPTION OF THE PREFERRED IMPLEMENTATIONS

Reference will now be made to the construction and operation of preferred implementations of the present invention, examples of which are illustrated in the accompanying drawings. The following description of preferred implementations of the present invention is only exemplary of the invention. The present invention is not limited to these implementations, but may be realized by other implementations.

Figure 1:
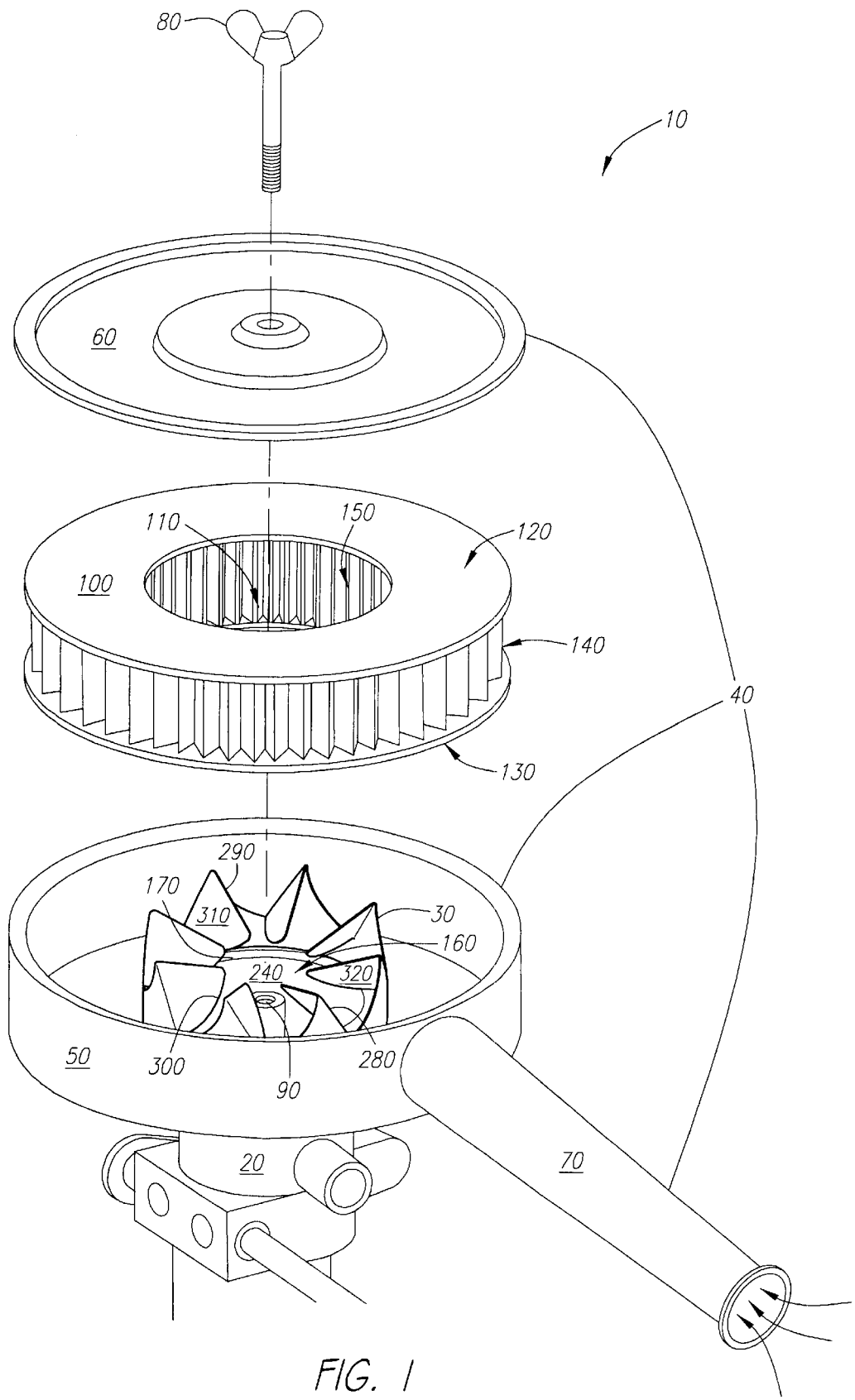
FIG. 1 is an illustration of a partially exploded, perspective view of a portion of an air intake system for an internal combustion engine employing a carburetor and depicting an air intake flow device.

FIG. 1 is an illustration of a partially exploded, perspective view of a portion of an air intake system 10 for an internal combustion engine of the type that employs a carburetor 20. The air intake system 10 is generally comprised of a standard air cleaner housing 40 mounted in standard fashion to a carburetor 20, and an air intake flow device 30. The air cleaner housing 40 is comprised of a housing base 50, a lid 60, and air inlet passageway 70, which facilitates the admittance of fresh air into the air cleaner housing base 50. Positioned between the upper surface of the base 50 and the inner surface of the lid 60 is an annular air filter 100 comprising a center opening 110, a top surface 120, a bottom surface 130, an air entry side 140, and an air exit side 150. A wing nut screw 80 secures the lid 60 to the housing base 50 via threads 90 located at the top of the carburetor housing 20.

At the top of the carburetor housing 20 is an air entry chamber 160 often referred to as an "air horn" or a "throat." Typically, as illustrated in FIG. 1, the air entry chamber 160 is defined by upwardly protruding walls 170 and is often circular in shape, although, other shapes such as rectangles, squares, ovals, semi circles, and other arcuate configurations have also been known to be employed.

Positioned within the center opening 110 of the air filter 100 around the air entry chamber 160 is an air intake flow device 30. The air intake flow device 30 is configured and dimensioned to fit around the outside of the walls 170 of the air entry chamber 160 in preferably a snug fashion. The height, (called out as H in FIG. 3A.) of the air intake flow device 30 is dimensioned to fit within the air cleaner housing 40 when the lid 60 is secured to the housing base 50 and in the preferred implementation depicted in FIG. 1 is approximately the same height as the air filter 100.

Figure 2:
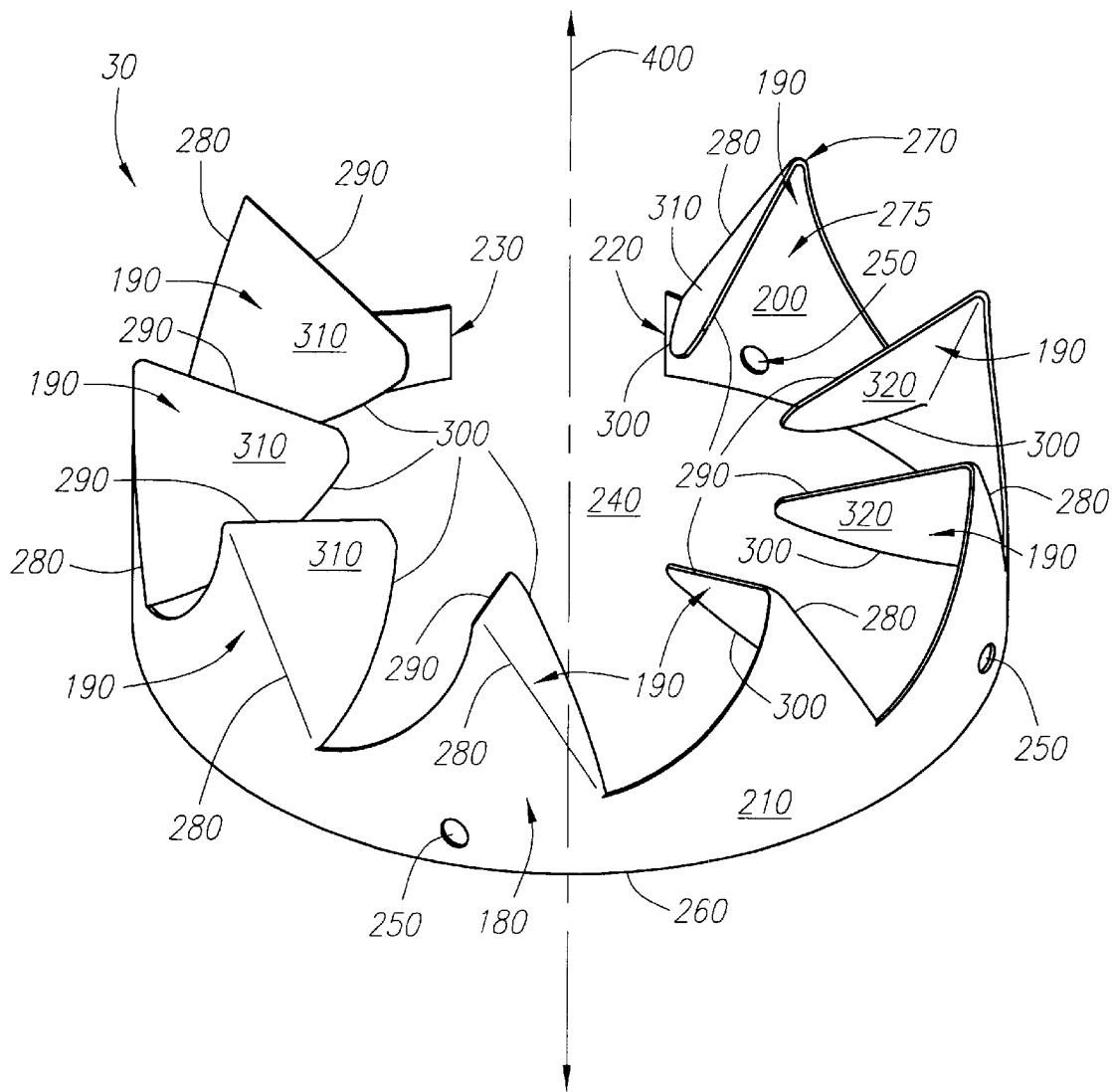
FIG. 2 is an illustration of a perspective view of the air intake flow device depicted in FIG. 1 with the ends of the device spaced apart from one another.
Figure 3A:
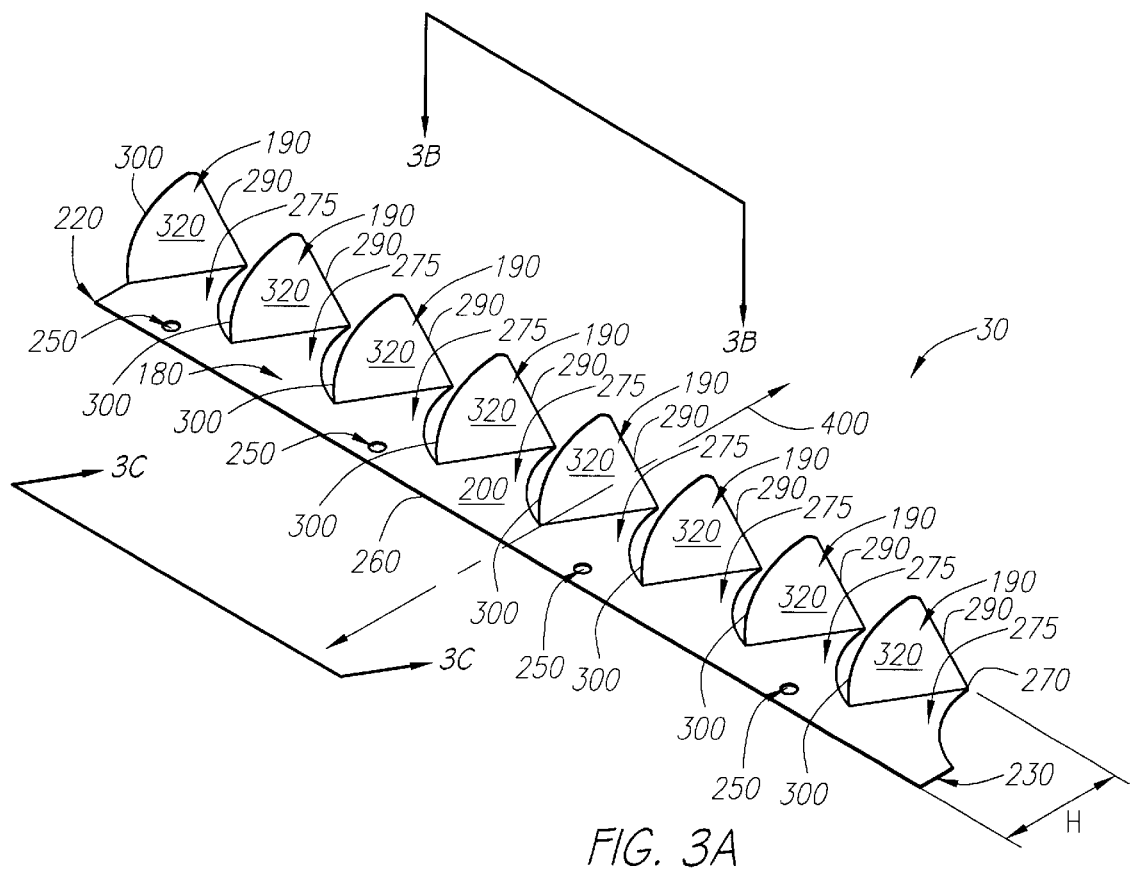
FIG. 3A is an illustration of a perspective view of the air intake flow device depicted in FIG. 2 with the skirt of the device flattened.

As best illustrated in FIGS. 2 and 3A, the air intake flow device 30 is comprised of a skirt 180 and multiple vanes 190, which function to direct the intake air into a vortex configuration (i.e., a whirling mass of air) as it passes into the air entry chamber 160. The skirt 180 is comprised of a first free end 220, a second free end 230, an inner surface 200, an outer surface 210, a bottom edge 260, a top edge 270, multiple holes 250 passing through the skirt 180, and an upper section 275 from which the vanes 190 extend. In the implementation depicted in FIG. 1, the inner surface 200 of the skirt 180 is fitted to the configuration of the outside of the walls 170 of the carburetor housing 20. Accordingly, the geometry of the walls 170 of the air entry chamber 160 at the position where the air intake flow device 30 is secured, generally defines the shape of the skirt 180. When fitted, the vanes 190 protrude inwardly from the inner surface 200 of the skirt 180 generally toward the center of the air entry chamber 160. The holes 250 in the skirt 180 are capable of functioning as a sort of cleat or grip to maintain the position of the air intake flow device 30 relative to the walls 170 of the air entry chamber 160. In this regard, it is noted that the holes 250 have a tendency to attract particulate accumulation, which has been found to improve the griping function of the holes 250.

The air intake flow device 30 may be constructed from metal, composite materials, or plastics. It is preferable, however, that the construction materials employed facilitate the adaptation of the air intake flow device 30 from a manufactured configuration to a wide variety of air entry chamber geometries and dimensions. Thus, savings relating to manufacturing tooling and inventory may be realized.

In order to facilitate the adaptation of the air intake flow device 30 to a wide variety of air entry chambers, it is preferable that the construction material employed be pliable so that the air intake flow device can be manipulated by hand pressure from a first manufactured configuration to a second desired configuration. In addition, it is also preferable that the construction material be capable of retaining the hand-manipulated shape without the aid of environmental restraints. Moreover, it is also preferable that the construction material embody a certain degree of elastic memory. Furthermore, it is also preferable that the construction material be capable of being readily cut by the installer to desired dimensions.

The capability of the material to retain the hand-manipulated shape without the aid of environmental restraints has been found advantageous in certain installations where the air entry chamber 160 does not function to restrain the configuration of the air intake flow device 30. For example, certain installations, such as the one depicted in FIG. 1, may require that the air intake flow device 30 be fitted to the outside of the air entry chamber 160. In these installations, it is preferable that the air intake flow device 30 be constructed of a material that is capable of retaining the desired configuration without the aid of environmental restraint. Furthermore, it may be advantageous that the vanes 190 be capable of being oriented to manipulate impinging airflow into a plurality of airflow configurations.

Figure 5:
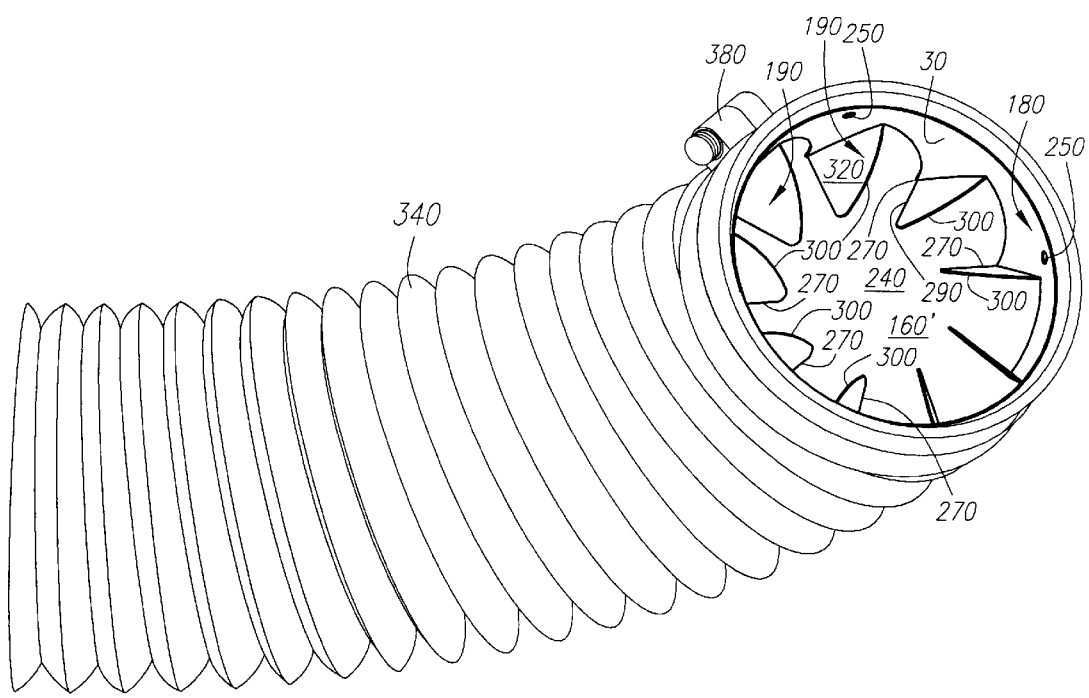
FIG. 5 is an illustration of a detailed view of the air intake flow device mounted within the air inlet hose of the air intake system illustrated in FIG. 4.
Figure 6:
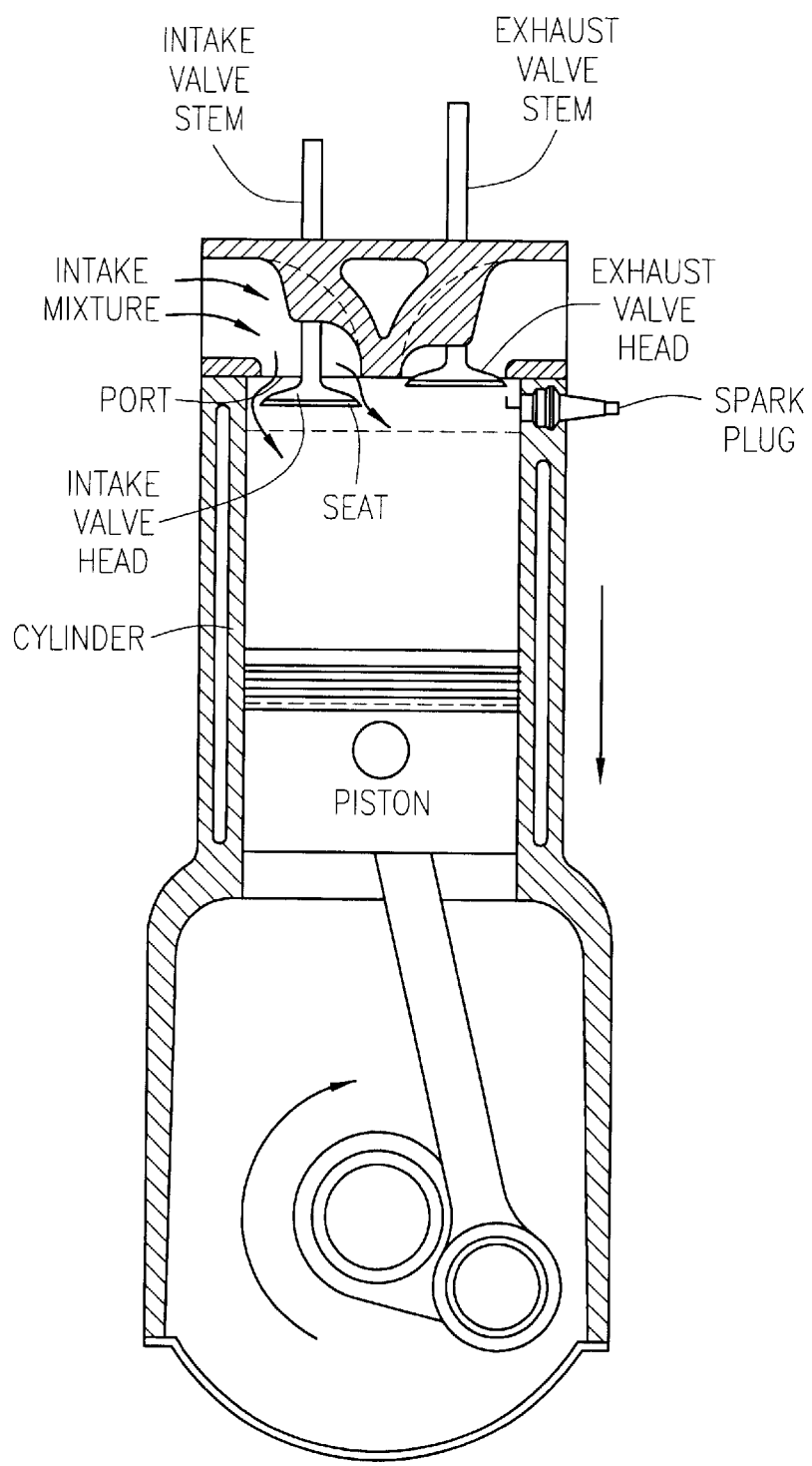
FIG. 6 is an illustration of a standard cylinder, piston and valve configuration for a reciprocating engine with the cylinder approaching bottom center crank position during the intake stroke.

The elastic memory property is desirable because it facilitates the creation of a bias or a tendency of the air intake flow device 30 to revert to a previous adapted configuration, which may be advantageous to maintaining the positioning. For example, regardless of whether the air intake device 30 is mounted within (as illustrated in FIG. 5) or around the outside (as illustrated in FIG. 1) of the air entry chamber, it is preferable that the installer configure or shape the air intake flow device 30 so that when the air intake flow device 30 is mounted to an air entry chamber, the skirt 180 of the air intake flow device 30 exerts a pressure or a bias against the walls of the air entry chamber. The bias or pressure assists in maintaining the position of the air intake device relative to the air entry chamber and as such reduces or eliminates the need for additional fasteners or mounting devices, which may jeopardize the integrity of the air entry chamber and may obstruct airflow. This property of elastic memory is of more significance in installations where the air intake flow device is installed within the air entry chamber as illustrated in FIG. 5. The reason for this is that the bias is the primary force if not the only force keeping the air intake flow device 30 in position. While it is understood that maintaining the positioning of the air intake flow device 30 within the air entry chamber to which it is mounted may be achieved by employing fasteners or other mounting methods, the preferred implementation avoids this need by manufacturing the air intake flow device 30 in a manner to maintain the desired position and orientation simply by instilling a bias.

As discussed in more detail below, it has been found that certain metals such as 304 stainless steel possess both the preferred capability of retaining a hand-manipulated shape without the aid of environmental restraints and a suitable elastic memory. However, it is noted that the manufacture of the air intake flow device 30 from materials that are not capable of retaining the hand-manipulated shape without the aid of environmental restraints, but are otherwise capable of being hand manipulated into the desired shape, and possess a suitable elastic memory may also be suitable for installations in which the air intake flow device 30 is installed within an air entry chamber. In those installations, the air entry chamber itself functions as the primary restraint to the configuration of the air intake flow device 30 and the elastic memory provides the bias for positioning the air intake flow device within an air entry chamber by tending, for example, to revert to the manufactured configuration of the device.

Materials, which may have these properties, include certain plastics, such as nylon, high-density polypropylene, or high-density polyurethane for example.

As previously noted, 304 stainless steel has been found to possess a suitable set of material properties. An air intake flow device 30 manufactured from 304 stainless steel has been found to be readily adapted to having its skirt shaped by the installer to the desired shape using hand pressure. Further, 304 stainless steel has been found to be capable of retaining a hand-manipulated shape without the need for added restraints. In addition, it has been found that 304 stainless steel possess suitable elastic memory to allow the skirt to exert a sufficient bias against the air entry chamber to maintain its position there around or therein.

Moreover, 304 stainless steel construction (as well as certain plastic and composite constructions) has been found to accommodate dimensional modifications by the installer. For example, the length of the skirt 180 can be shortened by the installer by cutting the free ends 220 or 230 of the air intake flow device 30 using, for example, a common metal shear or saw. In similar fashion, a reduction of the height of the skirt 180 can be achieved by cutting the bottom section of the skirt 180.

In addition, to concerns regarding manufacturing materials, it is presently understood that to facilitate the integrity of the air intake flow device 30 during adaptation and to reduce manufacturing costs, it is preferable to manufacture the air intake flow device 30 as integral unitary member. The following steps can achieve this unitary construction, for example in metal constructions of the device. Punching a planar sheet of metal with holes 250 at defined positions along a defined path. The holes 250 in addition to functioning as a cleat, as previously described, also facilitate the movement of the sheet metal along a manufacturing line. Punching or die cutting the arcuate edges or trailing edges 300 of the vanes 190 to define the surface area of the vane 190 and to facilitate the desired orientation (angle Φ discussed in more detail below) of the vane 190 upon bending. Cutting the metal sheets at the top edge 270 and bottom edge 260 to form strips of the desired height dimension of the skirt 180. Bending the vanes 190 into position at the desired angle (angle θ discussed in more detail below). Cutting the strips into the desired length or number of vanes 190. Lastly, roll pressing the flat strips (at the bottom section of the skirt 180) into the desired manufactured shape or configuration 180, which, for example, may be the generally circular configuration illustrated in FIG. 2.

With respect to the number of vanes 190, it has been found that 5 to 9 vanes work well, the number of course would be dependent on the air passageway 240 shape and dimensions and the dimensions of the vanes 190.

While the above described manufacturing process may be employed when manufacturing the air intake flow device 30 from metal (e.g., 304 stainless steel), it is to be understood that the air intake flow device 30 may also be manufactured as an integral unitary member from other materials, such as plastics or composites. However, such constructions may generally require the employment of a mold.

As illustrated in FIG. 1, the walls 170 of the air entry chamber 160 are generally circular; although, as previously discussed other configurations have also been known to be employed. While the preferred implementation illustrated in FIG. 1 depicts the air intake flow device 30 fitted to the outside of the air entry chamber 160 of the carburetor 20 it is contemplated that the intake flow device 30 may also be fitted within the air entry chamber 160 such that the outer surface 210 of the skirt 180 is positioned within the inside walls of the air entry chamber 160. Aspects of this type of installation are further discussed in reference to FIGS. 4 and 5 below.

The inner surface 200 of the skirt 180 defines an airflow passageway 240 (best illustrated in FIGS. 1, 2 and 5), which is generally coextensive with the cross-sectional area of air entry chamber to which it is mounted. The vanes 190 extend from the upper section 275 of the skirt 180 into the airflow passageway 240 at defined angles $\Phi$ and $\theta$, which are discussed in more detail below. The vanes 190 extend from the skirt 180 at a first leading edge 280, and further comprise a second leading edge 290, a trailing edge 300, an upper surface 310, and a lower surface 320. While the drawings illustrate the upper and lower surfaces 310 and 320 of the vanes 190 as generally flat, it is contemplated, however, that other vane surface configurations may be employed.

Figure 3B:
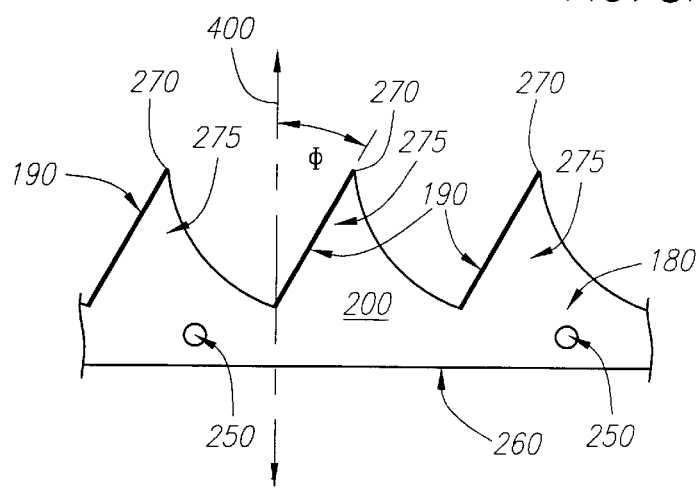
FIG. 3B is an illustration of a side view of a section of the air intake flow device depicted in FIG. 3A taken from line 3B—3B.

In the preferred implementation, the first leading edge 280 is parallel to the skirt 180 and, as best illustrated in FIG. 3B, is oriented at angle $\Phi$ relative to the longitudinal axis 400 of the air intake flow device 30. The longitudinal axis 400 is defined as an axis that is generally perpendicular to the cross-sectional area of the airflow passageway 240. When the air intake flow device is mounted to an air entry chamber 160 (also called out as 160' in FIGS. 4 and 5), the longitudinal axis 400 is usually also generally perpendicular to the cross-sectional area of the air entry chamber. In the implementation depicted in FIG. 1, the intake air flows through the air inlet passageway 70, passes through the air entry side 140 of the air filter 100, exits the air filter 100 at the air exit side 150, impinges upon the first leading edge. 280 of the vane 190, and passes over the surfaces of the vane 190 into the airflow passageway 240 and the air entry chamber 160 of the carburetor 20.

As best illustrated FIGS. 2 and 3A, the second leading edge 290 generally extends from the top edge 270 of the skirt 180 inwardly and downwardly into the airflow passageway 240 and the air entry chamber 160. The length of the second leading edge 290 is generally equal to the separation distance between neighboring vanes 190 along the skirt 180. Designing the second leading edge 290 so that its length is equal to the separation distance between the vanes 190 is not necessary to the implementation, however, such a design tends to maximize the available surface area of the vane 190 per unit length of the skirt 180 (i.e., the distance between the first free end 220 to the second free end 230 along the circumference of the skirt 180). Furthermore, while the illustrations of the air intake flow device 30 depict the vanes 190 equally spaced along the skirt 180 from one another, it is presently contemplated that the separation distance between the vanes 190 may be varied. Such variations, however, may adversely or otherwise effect the desired airflow dynamics induced by the vanes 190 and are likely to increase manufacturing costs. As such, it is presently preferable that equal separation distance between neighboring vanes 190 along the length of the skirt 180 be employed.

The trailing edge 300 is generally. facing the exit direction of the airflow after passing over the vane 190. In the illustrated implementations, the trailing edge 300 has an arcuate shape. It has been found that the arcuate shape of the trailing edge 300 provides additional surface area on the vane 190 while retaining adequate. structural stability to the upper section 275 of the skirt 180 at the first leading edge 280 to support the vanes 190. It is to be understood, however, that other shapes of the trailing edge 300 may also be employed.

As best illustrated in FIG. 3B and as previously noted, the defined angle $\Phi$ is the angle at which the first leading edge 280 is oriented relative to the longitudinal axis 400 of the air intake flow device 30. The defined angle $\Phi$ of the vanes 190 is preferably between 5 and 85 degrees, and more preferably between 7 and 80 degrees, even more preferably between 9 and 75 degrees, yet more preferably between 11 and 70 degrees, yet more preferably between 13 and 65 degrees, yet more preferably between 15 and 60 degrees, yet more preferably between 17 and 55 degrees, yet more preferably between 19 and 50 degrees, yet more preferably between 21 and 45 degrees, yet more preferably between 23 and 40 degrees, yet more preferably between 25 and 35 degrees, yet more preferably between 27 and 32 degrees, and yet most preferably substantially 30 degrees relative to the longitudinal axis 400.

Figure 3C:
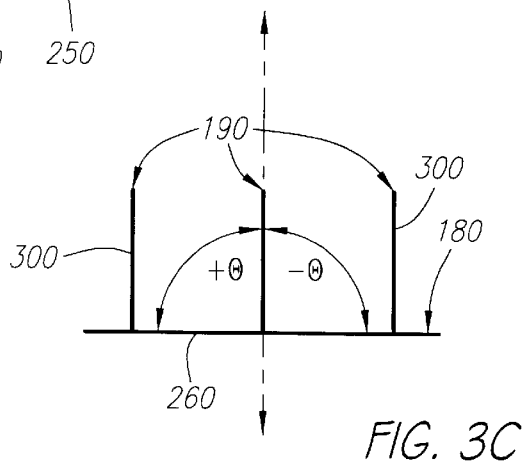
FIG. 3C is an illustration of a perspective bottom edge view of a section of the air intake flow device in FIG. 3B taken from line 3C—3C.

As best illustrated in FIG. 3C, angle $\theta$ is the angle in which the vane 190 extends from the inner surface 200 of the skirt 180. It is defined such that when $\theta$ is at 0 degrees the vane 190 extends generally perpendicular or normal to the inner surface 200 of the skirt 180 and as the angle $\theta$ departs from 0 degrees its upper and lower surfaces 310, 320 become more parallel with the inner surface 200 of the skirt 180. The defined angle $\theta$ of the vanes 190 is preferably between +/−60 degrees, and more preferably between 50 degrees, even more preferably between +/−40 degrees, yet more preferably between+/−30 degrees, yet more preferably between+/−20 degrees, yet more preferably between+/−10 degrees, yet more preferably between+/−5 degrees, and yet most preferably substantially at 0 degrees relative to normal (i.e., perpendicular to the inner surface 200 of the skirt 180).

It is to be understood, that the angle $\Phi$ and $\theta$ of the vanes 190 is dependent on the desired airflow direction. That is, as the angle $\Phi$ of the vanes 190 increases, the airflow passing over the vanes 190 is pitched more horizontally relative to the cross-sectional area of the air flow passageway 240. It is presently understood that the result of pitching the airflow in this manner results in what can be described as a vortex or swirl like configuration. The induction of such an airflow configuration has been found to improve gas mileage, increase horsepower, as well as reduce carbon monoxide and hydrocarbon emissions. It is presently understood that the reason for these results is increased air intake to the cylinder or improved mixing of the fuel and air prior to combustion, which is understood to likely result in improved oxidation of the fuel. It is also presently understood that the increased air intake is likely to be a result of similarities in geometry between the valve head and the swirling air flow or vortex. The similarities may likely result in the valve head posing less resistance to the intake mixture.

While it is contemplated that the angle $\Phi$ may be different for each vane 190 of the air intake flow device 30, it has been found that employing a consistent angle $\Phi$ for each vane 190 reduces turbulence while providing the desired airflow configuration.

The effects of variations of angle $\theta$ from normal, on the other hand, are dependent on which leading edge (280 or 290) that the airflow initially impinges upon. For example, in installations such as that depicted in FIG. 1, the intake air impinges upon the first leading edge 280 where as in installations such as that depicted in FIGS. 4 and 5 (discussed in detail below) the intake air impinges upon the second leading edge 290. In situations where the airflow impinges upon the first leading edge 280, increases in angle $\theta$ from normal results in increased obstruction by the vanes 190 to the airflow, which consequently results in an increase in pressure drop across the vane 190 and may also result in greater turbulence. Decreases in angle θ from normal, on the other hand, in certain implementations, results in less obstruction to the airflow impinging upon the first leading edge 280 because the surfaces of the vane 190 are shielded by the upper section 275 of the skirt 180. As a result, the ability of the vane 190 to induce a vortex configuration is reduced.

In contrast, in situations where the airflow impinges upon the second leading edge 290 (such as in the installation depicted in FIGS. 4 and 5), increases or decreases in angle θ from normal results in a reduction in the ability of the vane 190 to create a vortex configuration. The reason for this is that a smaller annular section of the airflow that passes through the airflow passageway 240 impinges on the second leading edge 290 and, therefore, less airflow is manipulated by the vane 190.

Thus, in order to limit pressure drop across the vane 190, avoid the creation of undesirable turbulence, and to maximize the function of the vane 190 in creating a vortex configuration, it is preferable that angle θ be substantially at 0 degrees so that the vane 190 extends from its first leading edge 280 substantially normal to or perpendicular to the inner surface of the skirt 180. This type of configuration is also conducive to functioning in installations where the airflow impinges on either the first or second leading edges 280 and 290. Furthermore, for the same reasons, previously discussed in relation to angle Φ, it is preferable that a consistent angle θ be employed for each vane 190 of the air intake flow device 30.

Figure 4:
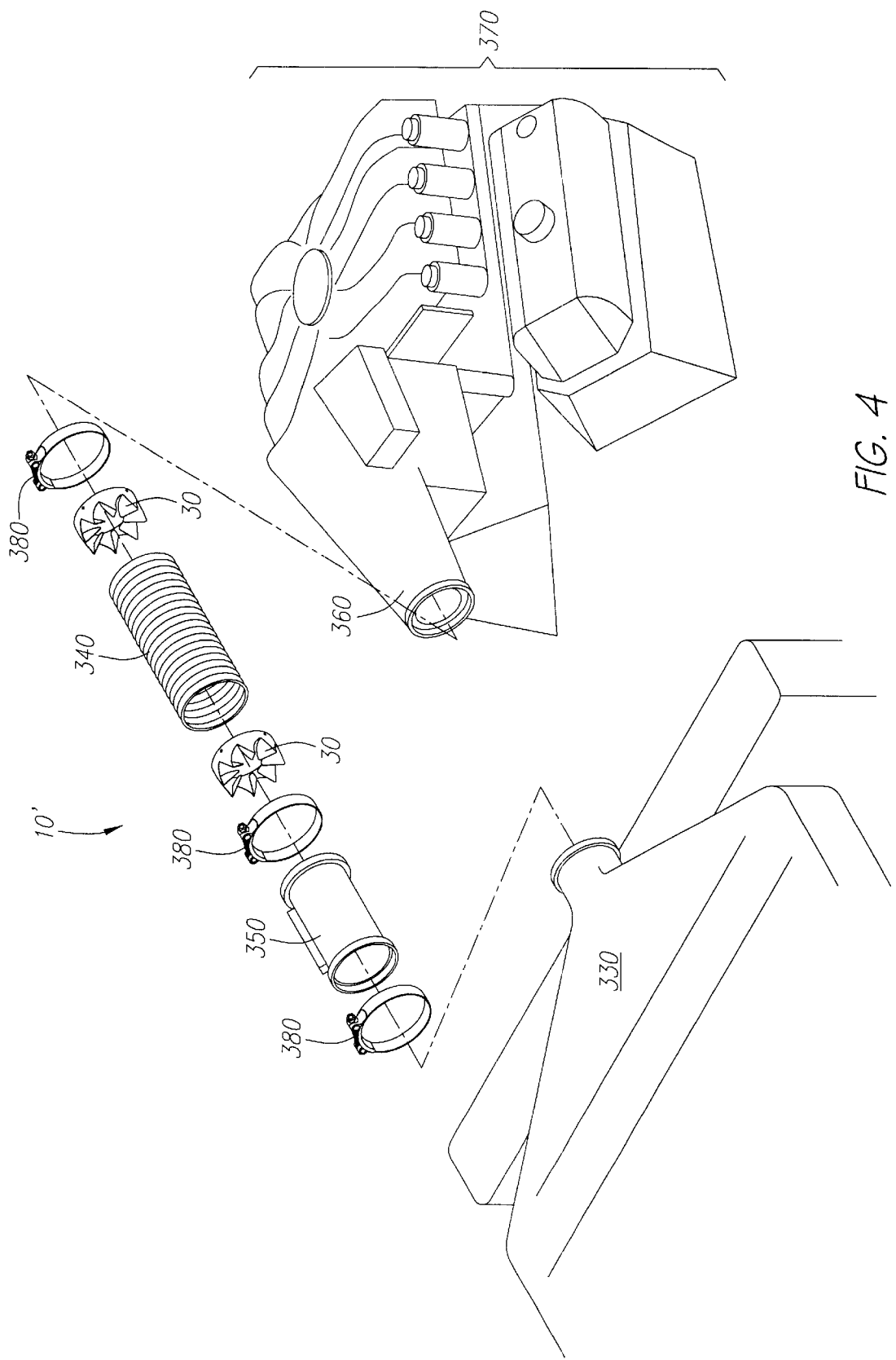
FIG. 4 is an illustration of a partially exploded, perspective view of a portion of an air intake system for a fuel injected internal combustion engine depicting the air intake flow device illustrated in FIGS. 2 and 3.

FIG. 4 is an illustrations of a partially exploded, perspective view of a portion of an air intake system 10' for a fuel injected internal combustion engine 370 employing the air intake flow device 30 illustrated in FIGS. 2 and 3. FIG. 5 is an illustration of a detailed view of the air intake flow device 30 (as previously described) mounted within the air inlet hose 340 of the air intake system 10' illustrated in FIG. 4. The air intake system 10' is generally comprised of an air filter unit 330, a mass air sensor 350 positioned up stream from the air filter unit 330, an air inlet hose 340 defining an air entry chamber 160', one or more air intake flow devices 30 housed within the air entry chamber 160' (best illustrated in FIG. 5), and a throttle body 360 downstream from the air inlet hose 340. Multiple clamps 380 secure elements in position relative.to one another.

In operation the intake air passes through and is filtered by the air filter unit 330. The intake air then passes through the mass air sensor 350 (which measures the quantity of airflow) and then through the air entry chamber 160' of the air inlet hose 340. While passing through the air entry chamber 160', the airflow passes through the airflow passageway 240 and impinges upon the second leading edge 290 of the vanes 190 of the air intake flow device 30. The vanes 190 manipulate the airflow into generally a vortex configuration. The intake air then enters the throttle body 360 where fuel is added prior to induction into the combustion chamber or cylinder of the engine 370.

It is noted that the air intake flow device 30 is mounted so that the top edge 270 of the skirt 180 is pointed upstream relative to the airflow. As best illustrated in FIG. 5, the internal dimensions and geometry of air entry chamber 160', in a similar fashion as the outer walls 170 of the air entry chamber 160 of the carburetor housing 20, determines the dimensions and geometry of the air intake flow device 30. Further, as with the air entry chamber 160 of the throat of a carburetor, the geometry and dimensions of a given air entry chamber 160' located between the air filter unit 330 and throttle body 360 for a fuel injected internal combustion engine may vary greatly. Thus, as in the implementation depicted in FIG. 1, it is preferable that the air intake flow device 30 be adaptable by the installer to various air entry chamber geometries and dimensions.

As previously noted, it is preferable that in this type of implementation (i.e., where the airflow device 30 is mounted within the air entry chamber), the installer configure the air intake flow device 30 in a fashion such that when mounted within the air entry chamber 160', the skirt 180 of the air intake flow device 30 exerts a bias against the interior of the air entry chamber 160'. Such a pre-installation configuration has been found to assist in maintaining the desired position of the air intake flow device 30 within the air entry chamber 160' without the need for additional fastening or mounting devices or methods. Other than the foregoing, the features, functions and manufacture of the air intake flow device 30 are as previously described.

While there has been illustrated and described what are at present considered to be preferred implementations, features and methods of the present invention, it will be understood by those skilled in the art that various changes and modifications may be made, and equivalents may be substituted for elements thereof without departing from the scope of the invention.

In addition, many modifications may be made to adapt a particular, element, feature or implementation to the teachings of the present invention without departing from the central scope of the invention. Therefore, it is intended that this invention not be limited to the particular implementations and methods disclosed herein, but that the invention include all implementations falling within the scope of the appended claims.

What is claimed is:

1. An air intake flow device for manipulating airflow passing through an air passage of an internal combustion engine, the air passage having a cylindrical wall, the device comprising:

an outer cylindrical skirt sized to abut the cylindrical wall of the air entry passage;

a plurality of vanes symmetrically arranged extending radially inward from said skirt, the vanes extending only partway toward a center axis of the passage, wherein each of said vanes comprises a generally planar triangular shape, with a first side disposed against the outer cylindrical wall, a second side disposed facing upstream into the airflow, and a third side facing downstream of the airflow, wherein said third side comprises a generally convex edge.

2. A device according to claim 1 wherein each said vane is oriented in a plane extending radially inward, slanted at an angle Φ to direction of the airflow, wherein said angle Φ is about 30 degrees.

3. A device according to claim 1 wherein each said vanes is oriented in a plane extending radially inward, slanted at an angle Φ to direction of the airflow, wherein said angle Φ is between 15 and 60 degrees.

4. A device according to claim 1 wherein each said vane is oriented in a plane extending radially inward, slanted at an angle Φ to direction of the airflow, wherein said angle Φ is between 5 and 85 degrees.

5. A device according to claim 1 wherein each said vane is oriented in a plane extending radially inward, slanted at an angle Φ to direction of the airflow, wherein said angle Φ is selected to achieve a desired vortex action for the airflow passing over the vanes.

6. A device according to claim 1 wherein each said vane is oriented in a plane extending radially inward, slanted at an angle Φ to direction of the airflow, wherein said angle Φ is selected from a range of between 25 and 35 degrees.

7. A device according to claim 1 wherein each said vanes is oriented in a plane extending radially inward, slanted at an angle Φ to direction of the airflow, wherein said angle Φ is between 21 and 45 degrees.

8. A device according to claim 1 wherein said second side comprises a generally straight edge.

9. A device according to claim 8 wherein said second side is tilted downstream from its radially outermost to its radially innermost position.

10. A device according to claim 1 wherein said second side comprises a leading edge for the vane and said third side comprises a trailing edge for the vane.

11. A device according to claim 10 wherein said leading edge is inclined relative to direction of airflow such that said leading edge is disposed gradually more downstream as the vane extends radially inwardly.

12. A device according to claim 10 wherein said leading edge is inclined relative to direction of airflow such that a radially inward portion is disposed downstream of a radially outward portion.

13. A device according to claim 1 wherein said plurality of vanes are configured extending only partway toward the center of the chamber to leave a center core of the chamber free of said vanes.

14. A device according to claim 1 wherein the device is constructed entirely from a single metal plate.

15. A device according to claim 1 wherein the device is constructed of stainless steel.

16. A method of manufacturing the device of claim 1 comprising the steps of forming said skirt from an elongated rectangular plate of a suitable material;

forming a plurality of generally parallel cuts into said plate from one elongated side, each cut corresponding to the third side of one of said vanes;

forming a vane by folding each cut portion over on itself to form a folded portion corresponding to the first side the vane, wherein the vane is in a plane perpendicular to the plate;

rolling the plate into a cylindrical shape with the vanes pointing radially inward.

17. A method according to claim 16 further comprising spacing the cuts along the elongated side by a distance corresponding to length of the second side.

18. An air intake flow device for manipulating airflow passing through an air passage of an internal combustion engine, the air passage having a cylindrical wall, the device comprising:

an outer cylindrical skirt sized to abut the cylindrical wall of the air entry passage;

a plurality of vanes symmetrically arranged extending radially inward from said skirt, the vanes extending only partway toward a center axis of the passage, wherein each of said vanes comprises a generally planar triangular shape, with a first side disposed against the outer cylindrical wall, a second side disposed facing upstream into the airflow, and a third side facing downstream of the airflow, wherein said second side and said third side of said vane intersect to form a rounded corner.

19. A device according to claim 18 wherein said first side and said second side intersect at a point upstream of an intersection of said second side and said third side.

20. A device according to claim 18 wherein the airflow comprises an air-fuel fluid mixture.

21. A device according to claim 18 wherein the device is constructed of an integral unitary member.

22. A flow device for manipulating flow of fluid passing through a cylindrical passage of an internal combustion engine, the device comprising:

a plurality of triangular-shaped vanes spaced about an inside periphery of the passage and extending radially inward, each vane comprising a first side disposed along the inside periphery of the passage, a second side disposed upstream, a third side disposed downstream, wherein said second and third sides intersect to form a corner disposed radially inward from the inside periphery of the passage, and wherein each vane is slanted at an angle Φ to direction of the fluid flow to create a swirling or vortex action in the passage, wherein said third side comprises a convex edge.

23. A device according to claim 22 wherein said angle Φ is about 30 degrees.

24. A device according to claim 22 wherein said angle Φ is between 15 and 60 degrees.

25. A device according to claim 22 wherein said angle Φ is between 5 and 85 degrees.

26. A flow device for manipulating flow of fluid passing through a cylindrical passage of an internal combustion engine, the device comprising:

a plurality of flat planar vanes spaced about an inside periphery of the passage and extending radially inward;

wherein the vanes extend only partway into the passage leaving a central opening within the passage clear of any vanes, wherein each vane is slanted at a positive angle Φ to direction of the fluid flow such that the vanes in combination create a swirling or vortex action in the passage, and wherein each vane comprising a leading edge tilted downstream from its radially outermost to its radially innermost position and a trailing edge having a generally convex shape.

27. A device according to claim 26 wherein said angle Φ is about 30 degrees.

28. A device according to claim 26 wherein said angle Φ is between 15 and 60 degrees.

29. A device according to claim 26 wherein said angle Φ is between 5 and 85 degrees.

* * * * *